(12) United States Patent
Tuzi et al.

(10) Patent No.: US 9,163,953 B2
(45) Date of Patent: Oct. 20, 2015

(54) LOW FUEL WARNING

(75) Inventors: Gerti Tuzi, Ferndale, MI (US); Sibu Varughese, Sterling Heights, MI (US)

(73) Assignee: DENSO International America, Inc., Southfield, MI (US)

( * ) Notice: Subject to any disclaimer, the term of this patent is extended or adjusted under 35 U.S.C. 154(b) by 400 days.

(21) Appl. No.: 13/587,995

(22) Filed: Aug. 17, 2012

(65) Prior Publication Data

US 2014/0052368 A1   Feb. 20, 2014

(51) Int. Cl.
*G01C 21/00* (2006.01)
*G01C 21/36* (2006.01)
*B60K 15/00* (2006.01)
*B60K 15/03* (2006.01)

(52) U.S. Cl.
CPC ............ *G01C 21/3697* (2013.01); *B60K 15/00* (2013.01); *G01C 21/3679* (2013.01); *B60K 2015/03197* (2013.01); *B60K 2015/03217* (2013.01)

(58) Field of Classification Search
CPC ............. B60K 15/00; B60K 2015/03197; B60K 2015/03217; G01C 21/3697; G01C 21/3682; G06F 7/00
USPC .......................................... 701/123
See application file for complete search history.

(56) References Cited

U.S. PATENT DOCUMENTS

| | | | |
|---|---|---|---|
| 7,693,651 B2 * | 4/2010 | Proefke et al. | 701/123 |
| 7,999,664 B2 | 8/2011 | Barajas | |
| 8,504,236 B2 * | 8/2013 | Guo et al. | 701/29.1 |
| 8,655,586 B2 * | 2/2014 | Jotanovic | 701/457 |
| 8,698,642 B2 * | 4/2014 | Taguchi | 340/636.1 |
| 2004/0260465 A1 * | 12/2004 | Tu | 701/209 |
| 2007/0090937 A1 * | 4/2007 | Stabler | 340/450.2 |
| 2009/0109022 A1 * | 4/2009 | Gangopadhyay et al. | 340/540 |
| 2009/0157289 A1 * | 6/2009 | Graessley | 701/123 |
| 2011/0032110 A1 * | 2/2011 | Taguchi | 340/636.1 |
| 2012/0116670 A1 * | 5/2012 | Rosekrans | 701/426 |
| 2013/0226441 A1 * | 8/2013 | Horita | 701/118 |
| 2013/0261953 A1 * | 10/2013 | Kiyama et al. | 701/400 |
| 2013/0282272 A1 * | 10/2013 | Kluge et al. | 701/425 |
| 2014/0019041 A1 * | 1/2014 | Kluge et al. | 701/430 |

* cited by examiner

*Primary Examiner* — John Q Nguyen
*Assistant Examiner* — Michael Whalen
(74) *Attorney, Agent, or Firm* — Harness, Dickey & Pierce, P.L.C.

(57) ABSTRACT

A low fuel notification system for use in association with a vehicular navigation system is operable to generate and provide notifications to the vehicle operator of low fuel conditions and provide information regarding available refueling stations based on the station's location and the vehicle's estimated driving range.

15 Claims, 4 Drawing Sheets

LOW FUEL WARNING

FIELD

The present disclosure relates generally to a low fuel warning system for use in motor vehicles. More particularly, the present disclosure is directed to a low fuel warning system used in association with a motor vehicle's navigation system to provide information indicative of the nearest refueling stations based on location information and estimated driving distance.

BACKGROUND

This section provides background information related to the present disclosure which is not necessarily prior art.

Navigation systems are becoming increasingly popular as a convenience accessory in many motor vehicles. As is well known, navigation systems typically assist the vehicle operator by locating destinations, providing primary and alternative routes and advising of local traffic and construction areas, as well as other useful information. As vehicular navigation systems continue to advance and provide additional useful information, it would be desirable to provide features capable of notifying the vehicle operator regarding low fuel level conditions and available refueling locations to avoid unintended low fuel or non-fuel situations.

SUMMARY

This section provides a general summary of the disclosure, and is not a comprehensive disclosure of its full scope or all of its features.

It is an aspect of the present disclosure to provide a low fuel warning system adapted for use with a navigation system in a motor vehicle.

It is a related aspect of the present disclosure to provide a low fuel warning system that is operable to notify the vehicle operator whether the vehicle has sufficient onboard sources of energy (fuel, battery charge or any other type of energy) available to reach the nearest refueling/re-charging station based on the stations location and the estimated driving distance calculated based on the vehicle's available energy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations such that the drawings are not intended to limit the scope or interpretation of the present disclosure. Accordingly, the above aspects, as well as other aspects, features and advantages of the present disclosure, will be understood from the following detailed description with reference to the drawings wherein.

Figure 3:
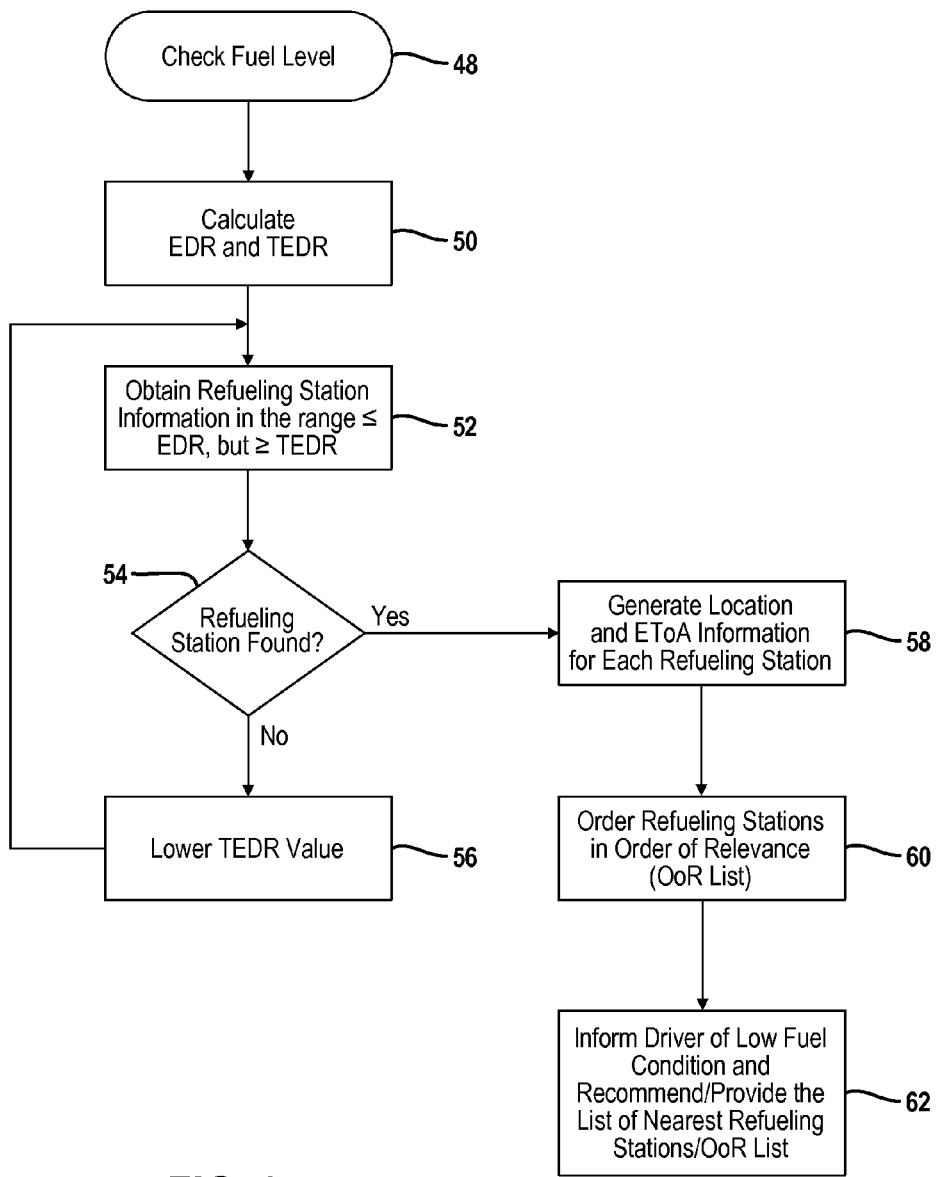
Figure 4:
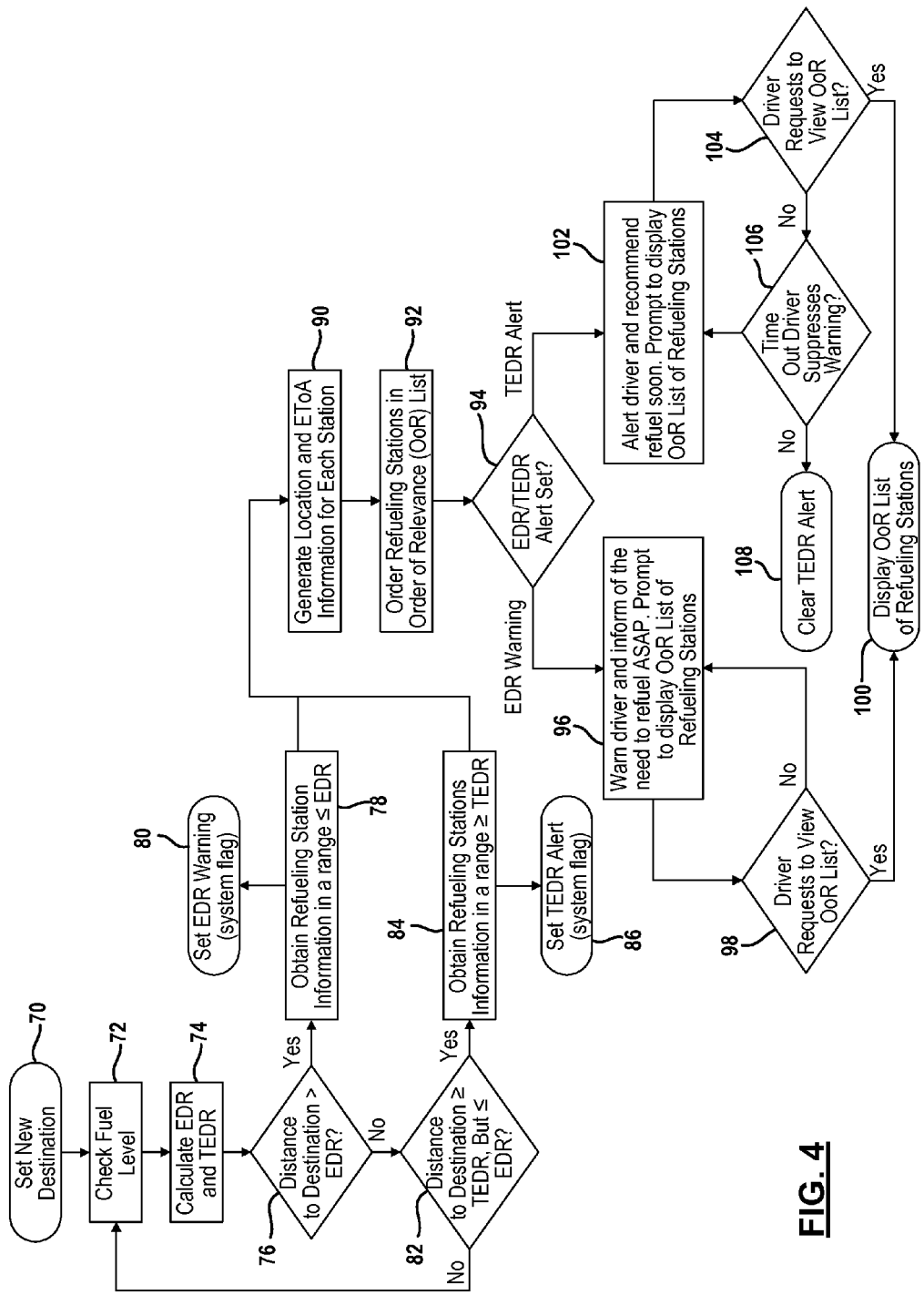

FIG. 3 is a flow chart of a method for determining and notifying a vehicle operator of a low fuel condition during a first use condition in accordance with the teachings of the present disclosure; and FIG. 4 is another flow chart of a method for determining and notifying a vehicle operator of a low fuel condition during a second use condition in accordance with the teachings of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In addition, the terminology used herein is only for the purpose of describing particular example embodiments and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Furthermore, the method steps, processes, and operations described herein are not to be construed as necessarily requiring their performance in the particular order discussed or illustrated, unless specifically identified as an order of performance. It is also to be understood that additional or alternative steps may be employed.

Figure 1:
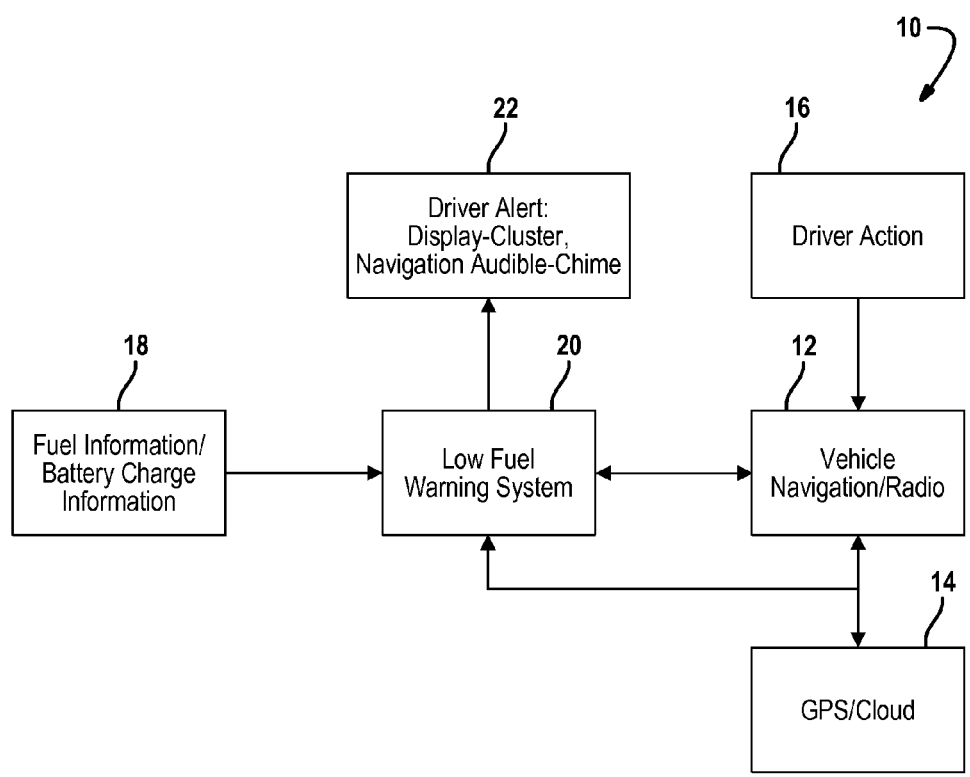
FIG. 1 is a block diagram of a low fuel warning system in accordance with the teachings of the present disclosure.

With particular reference to FIG. 1 of the drawings, a block diagram of a vehicle information system adapted for use with a motor vehicle is generally identified by reference numeral 10. The vehicle information system 10 is shown to generally include, or be associate with, a navigation/radio unit 12 of the type in communication with a global positioning system (GPS) or cloud-based data system 14. The block, identified as driver action 16, indicates input information and/or actions delivered and/or transmitted to the navigation unit 12. Such information/actions can include, without limitation, the identity of a desired destination location which is inputted via a voice command or a drive-initiated device (i.e., keypad, touchscreen, etc.) in a format readable by the navigation unit 12. The vehicle information system 10 further includes, or is associated with, an energy monitoring system, hereinafter referred to as, a "fuel information/battery charge information" system 18, which functions to continuously determine the available amount of energy available to the motor vehicle. The available energy can include the amount of available fuel (i.e., gasoline, diesel, propane, etc.) and/or the amount of available electrical energy (i.e., battery charge level, fuel cell capacity, etc.). Accordingly, the information system 10 of the present disclosure is well-suited for use with all types of vehicle propulsion systems.

The information monitored by the fuel information/battery charge information unit 18 is transmitted to a low fuel warning system 20 in addition to any other vehicular control systems utilizing this information. The low fuel warning system 20 is shown to be capable of communicating with the navigation unit 12 and the GPS/cloud system 14 and is adapted to provide a notification to the vehicle operator, as shown by a block 22, that is indicative of a low fuel condition. As will be detailed hereinafter with greater specificity, the notification can be either a low fuel "Warning" or a low fuel "Alert" depending on the current energy availability.

Figure 2:
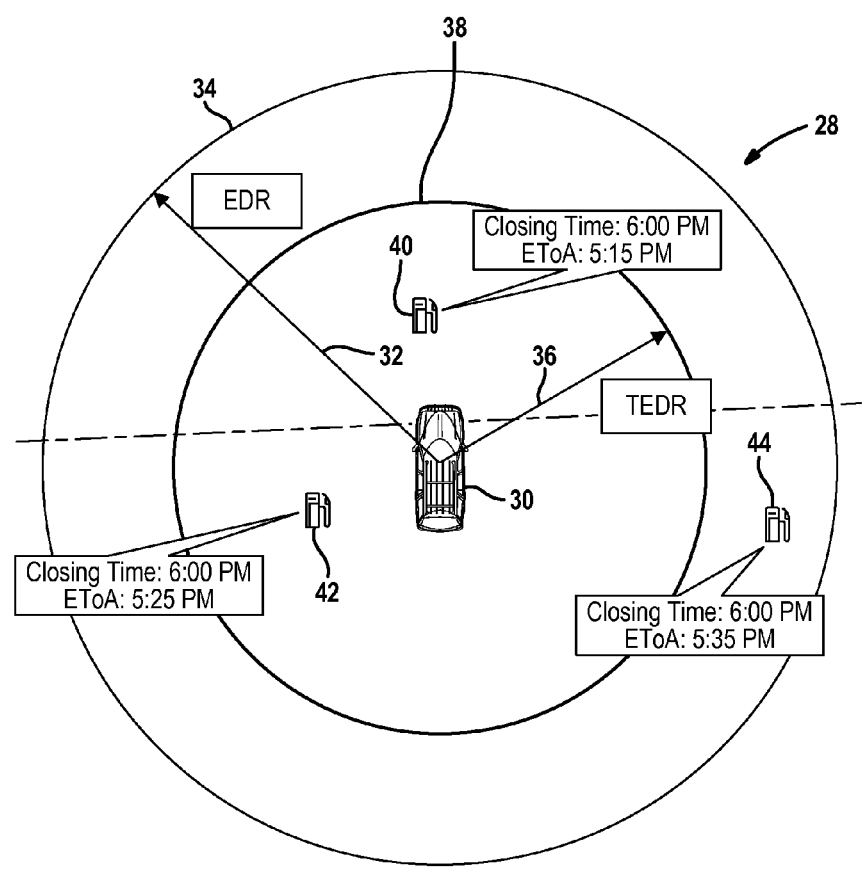
FIG. 2 is an exemplary visual indicator that can be associated with the low fuel warning system of the present disclosure.

Referring now to FIG. 2, an exemplary illustration of a graphical interface 28 provided by the vehicular information system 10 via the navigation unit 12 is shown in an aerial and circular/symmetric format to show the current location of a motor vehicle 30 in relation to an estimated driving range (hereinafter "EDR") and a threshold estimated driving range (hereinafter "TEDR") which is less than the EDR. Both the EDR and the TEDR are calculated by the low fuel warning system 20 based on several operational characteristics which can include, without limitation, the vehicle's current and historical fuel economy (MPG), driving behavior, road type (city, highway, etc.), historical data on traffic conditions and/or current traffic conditions from the GPS system 14, among others.

The EDR is shown in FIG. 2 by a first radius line 32 which establishes a first range of travel 34. Likewise, the TEDR is shown by a second radius line 36 which establishes a second range of travel 38. Those skilled in the art will recognize that the ranges shown are not truly circular since actual travel will be dependent on the road geography. The TEDR is calculated as a predetermined percentage of the EDR which, for example, may be in the range of about 60-80%. As will be appreciated, the EDR and TEDR are estimated distance values that are calculated dynamically as the vehicle 30 is moving. It will be understood that the graphical interface 28 is merely an exemplary illustration of one available type of information and notification delivery format and that the estimated driving ranges do not need to be shown in any specific format as long as the output format provides the vehicle operator with the current EDR and TEDR values.

The low fuel warning system 20 is operable to perform a location/distance-based search of "available" refueling stations in a range no larger than the EDR. Only refueling stations that meet certain requirements (i.e., types of fuel, hours of operation, etc.) are considered to be "available" and offered to the vehicle operator. FIG. 2 illustrates the location of three exemplary available refueling stations 40, 42 and 44. The first and second refueling stations 40, 42 are located within the TEDR while the third refueling station 44 is shown located within the EDR but outside of the TEDR. Associated with each available refueling station is an information bullet showing the stations closing time and the estimated time of arrival (EToA) for vehicle 30. As will be detailed, the low fuel warning system 20 is operable to identify all available refueling stations within the EDR, but can initially advise the vehicle operator to refuel at refueling stations located within the TEDR.

As noted, identification of the available refueling stations is based on the vehicle information system 10 performing a location/distance-based search of all refueling stations which meet the search requirements, and preferably in a range no larger than the vehicle's current TEDR. If a destination is set on the navigation unit 12, the information system 10 will determine whether the vehicle 30 can reach the destination without refueling. Also, if the route includes freeways/highways, the information system 10 will calculate and inform the vehicle operator of the nearest exit recommended for refueling. If no available refueling stations are identified beyond the TEDR and within the EDR that meet the requirements, the system will notify the operator to refuel within the TEDR distance. Moreover, refueling stations located in a range greater than the TEDR but smaller than the EDR can be labeled as "critical" to further assist in notifying the vehicle operator of the low fuel condition. While described as "refueling" stations, those skilled in the art will appreciate that this term is intended to encompass any and all specific types of energy (i.e., fuel or electricity) required for the vehicle's propulsion system.

FIG. 3 illustrates a flow chart for a method for generating a low fuel notification in the situation when the vehicle operator has not set a preferred destination into the navigation unit 12. In step 48, the available fuel information is provided by the fuel monitoring system 18 to the low fuel warning system 20. In step 50, the distances for the EDR and the TEDR are calculated. As mentioned, these estimated distances are based on several factors including the available fuel on board the vehicle 30, the vehicle's historical fuel economy, the type of road, traffic conditions and/or driving habits. In step 52, available refueling stations that meet the predefined requirements and are located in a driving range less than or equal to the EDR but greater than or equal to the TEDR are identified. In step 54, a determination is made whether one or more available refueling stations meeting the criteria of step 52 have been identified. If a determination is made that no available refueling stations are located in the driving range between the EDR and the TEDR, then the TEDR value is lowered at step 56 for use in locating an available refueling station. If the determination is made that one or more refueling stations are available, then the information related to each available station's location and the vehicle's EToA is generated at step 58. At step 60, the available refueling stations are arranged and/or listed, preferably in an order of relevance (hereinafter "OoR"). The criteria for determining the OoR can be based on one or more non-limiting user-requested inputs such as: minimal distance from current vehicle location; minimal distance to target path of travel (as determined by the navigation unit 12, if set); maximum difference between the EToA and the closing time for each station; and the brand of fuel sold. Finally, at step 62, the vehicle operator is provided with notification information (via a visual and/or audio display) advising of the low fuel condition and providing the OoR list from step 60. If step 60 is eliminated, the notification information provided at step 62 would simply include a list of the nearest available refueling stations. Furthermore, one motor vehicle 30 starts moving in a certain direction, the priority of the list is based primarily on the available refueling stations located in the direction of travel.

With reference to FIG. 4, a flow chart for a method for generating a low fuel notification is shown in the situation when the vehicle operator has set a destination via the navigation unit 12. Specifically, step 70 indicates the input by the vehicle operator of a desired destination. At step 72, the fuel level of the motor vehicle 30 is check. At step 74, the EDR and TEDR distances are calculated. At step 76, a determination is made whether the distance to the destination is greater than the EDR distance. If a determination is made that the distance to the destination is greater than the EDR distance, then information on available refueling stations within the EDR distance is obtained at step 78. Step 80 indicates that an "EDR Warning" flag is set. However, if a determination is made at step 76 that the distance to the destination is less than the EDR distance, then another determination is made at step 82. The determination at step 82 includes whether the distance to the destination is greater than/equal to the TEDR distance and less than/equal to the EDR distance. If the determination at step 82 is no, the current fuel supply is considered adequate to permit the motor vehicle 30 to arrive at the desired destination without refueling. As such, the control routine returns to step 72. In contrast, if at step 82 it is determined that the destination is located between the TEDR and the EDR, then information on available refueling stations within the TEDR distance is obtained at step 84. Step 86 indicates that a "TEDR Alert" flag is set.

The information for the available refueling stations within the EDR (from step 78) and the available refueling stations within the TEDR (from step 84) is used to generate the location and EToA for each available refueling station at step 90. At step 92, the available refueling stations are arranged and/or listed in an OoR list. In step 94, a determination is made whether an EDR Warning flag (from step 80) or a TEDR Alert flag (from step 86) had been set. If an EDR Warning flag had been set, step 96 indicates that the information system 10 provides a Warning to the vehicle operator to refuel as soon as possible and may prompt the operator to display the OoR list from step 92. This list can include the location of all available refueling stations within the EDR. At step 98, a determination is made whether the vehicle operator has requested to view the OoR list. If yes, the information system 10 displays the OoR list, as indicated by step 100. If no, the Warning and prompt from step 96 are maintained.

Returning to the determination made at step 94, if a TEDR Alert flag had been set, step 102 indicates that the information system 10 provides an Alert to the vehicle operator recommending to refuel soon and can prompt the operator to display the OoR list from step 92. At step 104, a determination is made whether the vehicle operator has requested to view the OoR list. If yes, the information system 10 displays the OoR list. If no, a determination is made at step 106 whether the Alert has timed out or been suppressed by the vehicle operator. If yes, the TEDR Alert flag is cleared at step 108. If no, the Alert and the OoR prompt are maintained. As will be appreciated, upon refueling of the motor vehicle 30, the Warning and Alert system flags of steps 80 and 86 are cleared.

The foregoing description of the exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for providing a low fuel notification to an operator of a motor vehicle, the method comprising the steps of:
    determining a current amount of fuel in the vehicle;
    calculating an estimated driving range based on the current amount of fuel;
    calculating a threshold estimated driving range that is a predefined percentage less than the estimated driving range;
    obtaining information on refueling stations located between the estimated driving range and the threshold driving range;
    determining whether any of the refueling stations are available based on a set of predefined requirements; wherein the threshold estimated driving range is reduced if it is determined that no refueling stations are available;
    generating a list of the available refueling stations; and
    generating a low fuel notification and providing the vehicle operator with a list of available refueling stations; wherein
        the information obtained on the available refueling stations is based on a location and distance-based search of the refueling stations meeting the set of predefined requirements; and
        the set of predefined requirements includes an estimated time of arrival from the vehicle's current location to the refueling station and the hours of operation of the refueling station.

2. The method of claim 1 wherein the estimated driving range is associated at least in part with the vehicle's fuel economy.

3. The method of claim 1 wherein the reduced threshold estimated driving range is subsequently used to obtain information on refueling stations located between the estimated driving range and the reduced threshold estimated driving range.

4. The method of claim 1 further including the step of ordering the list of available refueling stations based on predetermined criteria for determining relevance.

5. The method of claim 4 wherein the predetermined criteria for determining relevance includes a calculation of the minimal distance from the vehicle's current location to each of the available refueling stations.

6. The method of claim 4 wherein the predetermined criteria for determining relevance includes calculating a minimal distance from the vehicle's current location to each of the available refueling stations along a direction of travel.

7. The method of claim 1 further including the steps of:
    setting a destination into a navigation system prior to calculating the estimated driving range and the threshold estimated driving range;
    determining whether the distance to the destination is greater than the estimated driving range;
    determining whether the distance to the destination is greater than the threshold estimated driving range but less than the estimated driving range;
    generating a low fuel warning when the distance to the destination is greater than the estimated driving range; and
    generating a low fuel alert when the distance to the destination is greater than the threshold estimated driving range but less than the estimated driving range.

8. A method for providing a low fuel notification to an operator of a motor vehicle, comprising the steps of:
    calculating a distance to a destination;
    determining a current amount of fuel in the vehicle;
    calculating an estimated driving range based on the current amount of fuel;
    calculating a threshold estimated driving range that is a predefined percentage less than the estimated driving range;
    determining whether the distance to the destination is greater than the estimated driving range;
    determining whether the distance to the destination is greater than the threshold estimated driving range in response to a determination that the distance to the destination is less than the estimated driving range;
    obtaining information on refueling stations located between the estimated driving range and the threshold estimated driving range;
    determining whether any of the refueling stations are available based on a set of predefined requirements; wherein the threshold estimated driving range is reduced if it is determined that no refueling stations are available;

generating a list of the available refueling stations;
warning the vehicle operator in response to a determination that the distance to the destination is greater than the estimated driving range;
alerting the vehicle operator in response to a determination that the distance to the destination is greater than the threshold estimated driving range; and
providing the list of available refueling stations in conjunction with both the warning and the alert; wherein
the set of predefined requirements includes an estimated time of arrival from the vehicle's current location to the refueling station and the hours of operation of the refueling station.

9. The method of claim 8 wherein the estimated driving range is associated at least in part with the vehicle's fuel economy.

10. The method of claim 8 wherein the information obtained on the available refueling stations is based on a location and distance-based search of the refueling stations meeting the set of predefined requirements.

11. The method of claim 8 wherein the threshold estimated driving range is reduced if it is determined that no refueling stations are available, and wherein the reduced threshold estimated driving range is subsequently used to obtain information of refueling stations located between the estimated driving range and the reduced threshold estimated driving range.

12. The method of claim 8 further including the step of ordering the list of available refueling stations based on predetermined criteria for determining relevance.

13. The method of claim 12 wherein the predetermined criteria for determining relevance includes calculating a minimal distance from the vehicle's current location to the available refueling station.

14. The method of claim 8 further including the step of calculating and informing the drive of a low fuel condition and advising the driver to select a particular exit when driving on a freeway/highway.

15. A method for providing a low fuel notification to an operator of a motor vehicle comprising:
calculating a distance to a destination;
determining a current amount of fuel in the vehicle;
calculating an estimated driving range based on the current amount of fuel;
calculating a threshold estimated driving range that is less than the estimated driving range;
determining whether the distance to the destination is greater than the estimated driving range;
determining whether the distance to the destination is greater than the threshold estimated driving range in response to a determination that the distance to the destination is less than the estimated driving range;
obtaining information on refueling stations located between the estimated driving range and the threshold estimated driving range;
determining whether any of the refueling stations between the estimated driving range and the threshold estimated driving range are available based on at least hours of operation and whether the refueling stations are within the estimated driving range;
generating a list of the available refueling stations located between the estimated driving range and the threshold estimated driving range;
warning the vehicle operator in response to a determination that the distance to the destination is greater than the estimated driving range;
alerting the vehicle operator in response to a determination that the distance to the destination is greater than the threshold estimated driving range;
providing to the vehicle operator, in conjunction with both the warning and the alert, the list of available refueling stations located between the estimated driving range and the threshold estimated driving range, the list excluding refueling stations located beyond the estimated driving range; and
reducing the threshold estimated driving range upon determining that no refueling stations are available, the reduced threshold estimated driving range is subsequently used to obtain information on only the refueling stations located between the estimated driving range and the reduced threshold estimated driving range thereby excluding refueling stations located beyond the estimated driving range.

* * * * *